United States Patent [19]

Ruffen

[11] Patent Number: 4,787,729
[45] Date of Patent: Nov. 29, 1988

[54] EYEGLASS NOSE SUPPORT

[76] Inventor: Kenneth T. Ruffen, 84 Walnut St., Hyannis, Mass. 02601

[21] Appl. No.: 88,667

[22] Filed: Aug. 24, 1987

[51] Int. Cl.⁴ .................................................. G02C 5/12
[52] U.S. Cl. ..................................... 351/137; 351/131
[58] Field of Search ................. 351/87, 131, 132, 136, 351/137, 138

[56] References Cited

U.S. PATENT DOCUMENTS 2,298,832 10/1942 Mowrer .............................. 351/131
4,252,422 2/1981 Speckhart .......................... 351/137

Primary Examiner—Rodney B. Bovernick
Assistant Examiner—P. M. Dzierzynski
Attorney, Agent, or Firm—William Nitkin

[57] ABSTRACT

An eyeglass nose bridge support having a support member attached to the bridge of the eyeglasses with a nosepiece extending from the support member adapted to rest upon the central portion of the bridge of the nose including attachment and adjustment members to adjustably position the nosepiece.

3 Claims, 3 Drawing Sheets

EYEGLASS NOSE SUPPORT

BACKGROUND OF THE INVENTION

1. Field of the Invention

The device of this invention resides in the area of eyeglasses and more particularly relates to a nose support being a central member adapted to rest upon the top of the bridge of the nose.

2. Description of the Prior Art

Eyeglass supports of the prior art utilize what are referred to as side nose pieces each of which rests respectively on one side of the wearer's nose. Such nose pieces can often cause discomfort, disfiguration of the skin and discoloration at the sides of the dorsum of the nose where capillaries are stressed by the constant pressure thereon which capillaries have difficulty in properly supplying the tissues thereunder after long periods of time of wearing such eyeglasses. The advantages of having a central single nose support on the top of the bridge of the nose have been recognized in prior U.S. patents such as in U.S. Pat. No. 1,789,937 to T. F. Curran issued Jan. 20, 1931. Another patent which appreciates this feature was issued to James B. Bradley, Jr. on Dec. 26, 1978 being U.S. Pat. No. 4,131,341 where it was also recognized that many of the prior art eyeglasses with dual side nose pieces slip because of poor fit against the sides of the nose and allow the glasses to slide forward. The one-piece nose support of Bradley provided for a large skin contact area on the bridge of the nose and had outward projections protruding to the sides of the nose to help in the support of the eyeglasses. U.S. Pat. No. 4,252,422 to S. Speckhart for an Adjustable Spectacle Nosepiece also shows the use of a central support above the bridge of the nose which is held in place by a suspension frame attached to the glasses.

SUMMARY OF THE INVENTION

It is an object of this invention to provide a unique design for providing an eyeglass frame having a single central nose support pad disposed above the center of the nose at location just above the point where the dorsal cartilage joins the nasal bone.

It is a further object of this invention to provide a device which can be retrofitted on existing eyeglass frames either by a clip-on adapter or which can be directly attached to the frames by being attached to the crossbar or bridge member which are commonly utilized in plastic and metal eyeglass frames.

The purpose of the invention is to first relieve discomfort, disfiguration and discoloration at the sides of the dorsum of the nose caused by use of the two-pad nose support system of the prior art as detailed above.

It is a further object of this invention to provide a device which supports the eyeglasses on the bridge of the wearer's nose at an angle which helps to distribute the weight of the glasses so that more of the weight is supported by the temple elements of the frame which extend behind the ears.

It is yet a further object of this invention to provide a nose support having adjustments and padding which reduce slippage on the nose.

The device of this invention can be made of the same lightweight materials from which current glasses are made such as titanium alloys, stainless steel or equivalents which can be plated or anodized if desired. Also the device of this invention can be incorporated in plastic frames as well. Other decorative features can be utilized on the device of this invention such as monograms, jewelry or various color-coordinations.

Basically the device of this invention for fitting on existing frames can have an H-shaped support member with hooks at the ends of each of the arms of the H-shaped support member which can be attached to the bridge member(s) connecting the left eyeglass frame portion to the right eyeglass frame portion, such frames not having the typical prior art dual side nose support members thereon. The nosepiece of this invention extends downward from the bridge of the frame and is angularly adjustable to fit each wearer with the nosepiece resting on top of the bridge of the nose thereby supporting the center of the eyeglass frame on the bridge of the nose and distributing the weight of the frame between the temple portions' earpieces and the nosepiece.

DESCRIPTION OF THE PREFERRED EMBODIMENT(S)

Figure 1:
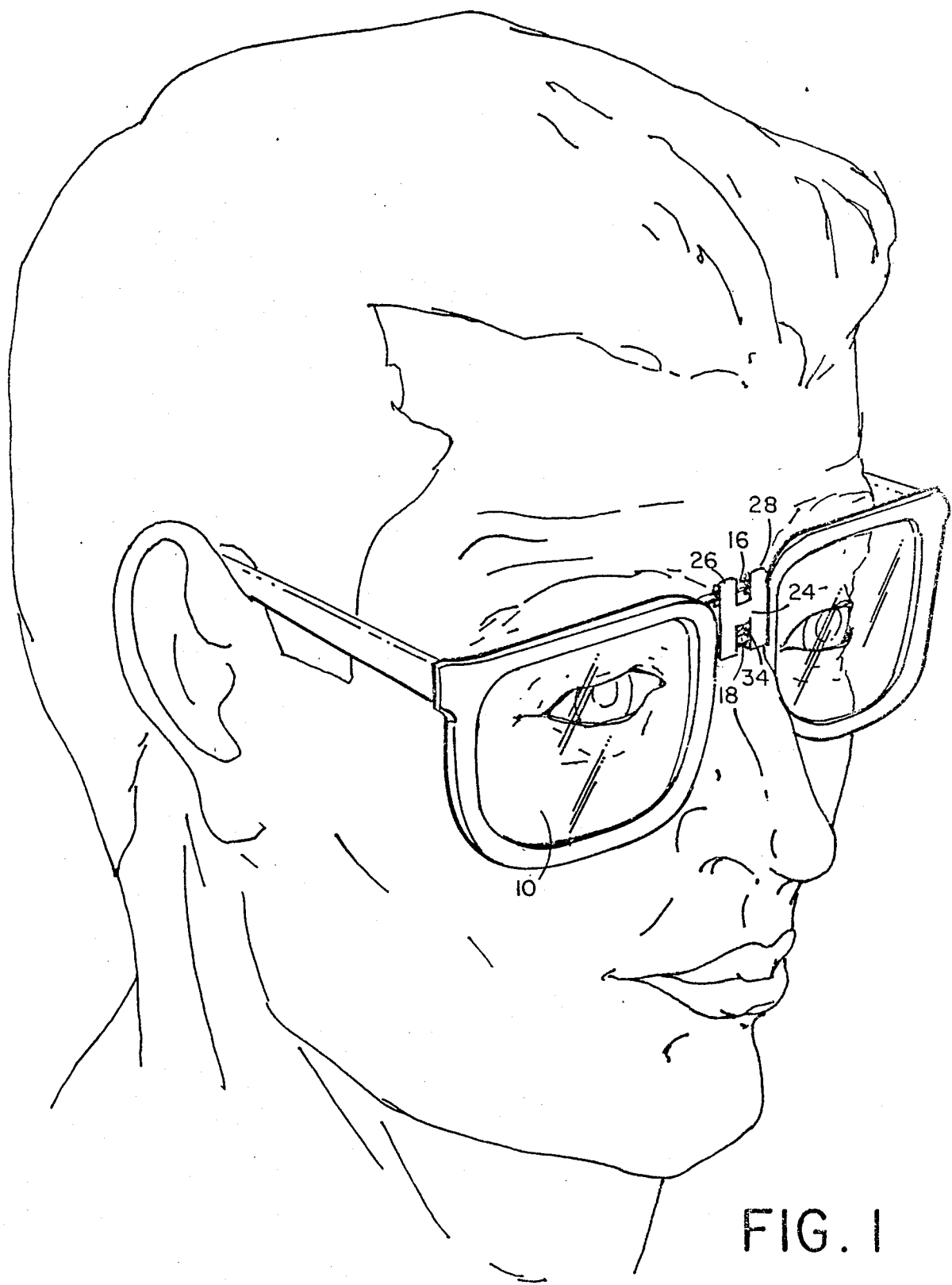
FIG. 1 illustrates a perspective view of the device of this invention installed on a typical eyeglass frame.

FIG. 1 illustrates a user wearing eyeglasses 10 having upper bridge member 16 and lower bridge member 18 connecting the left and right eyeglass frame members together on which bridge members is installed support member 24 of this invention which has attached thereto nosepiece member 34 which rests on top of the bridge of the nose.

Figure 2:
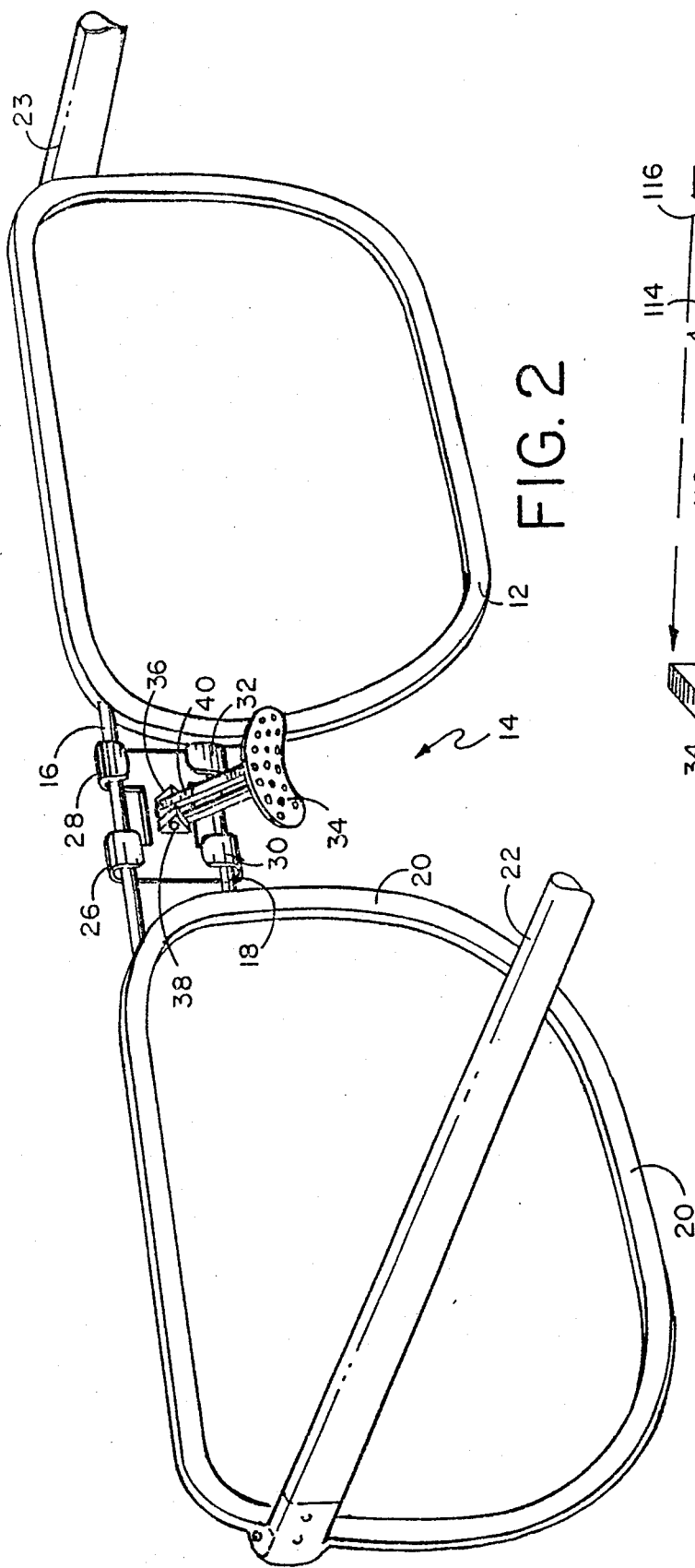
FIG. 2 is a rear perspective view of a pair of eyeglasses with the device of this invention installed thereon.

FIG. 2 shows a detailed rear perspective view of eyeglasses 10 on which the device of this invention is installed. Seen in this view connecting right frame 12 to left frame 20 is upper bridge member 16 and lower bridge member 18. Not seen in this view within the nose receipt area 14 are side nose support members of the prior art which are not utilized in this embodiment. Extending rearward from the eyeglass frames 12 and 20 are temple earpieces 22 and 23 which attach around the ears of the wearer. Clipped onto upper bridge member 16 and lower bridge member 18 is H-shaped support member 24. Adjustably attached to the arms of the H are first hook member 26 and second hook member 28 which attach around and are secured by tightening against and around upper bridge member 16. At the lower arms of support member 24 are attached third hook member 30 and fourth hook member 32 which are adjusted upwards and secured to lower bridge member 18.

Figure 7:
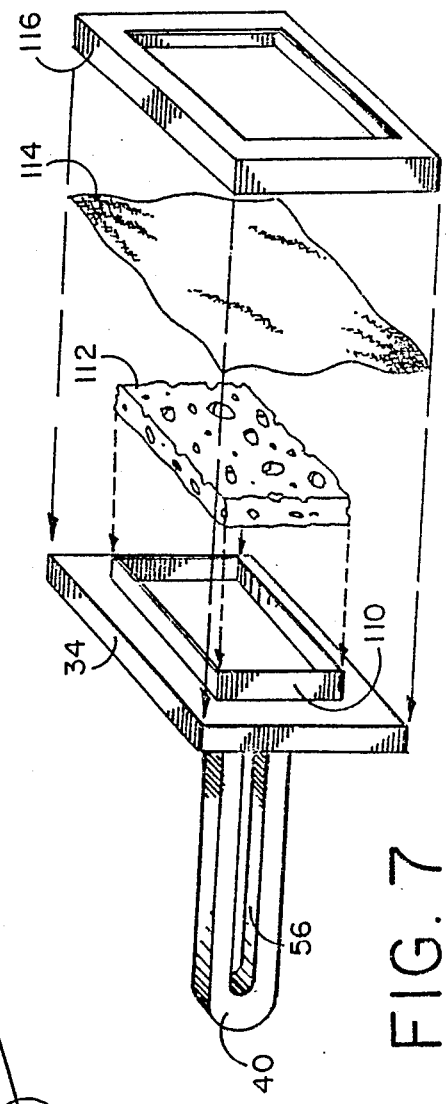
FIG. 7 illustrates one system of providing a cushion on the pad member.
Figure 3:
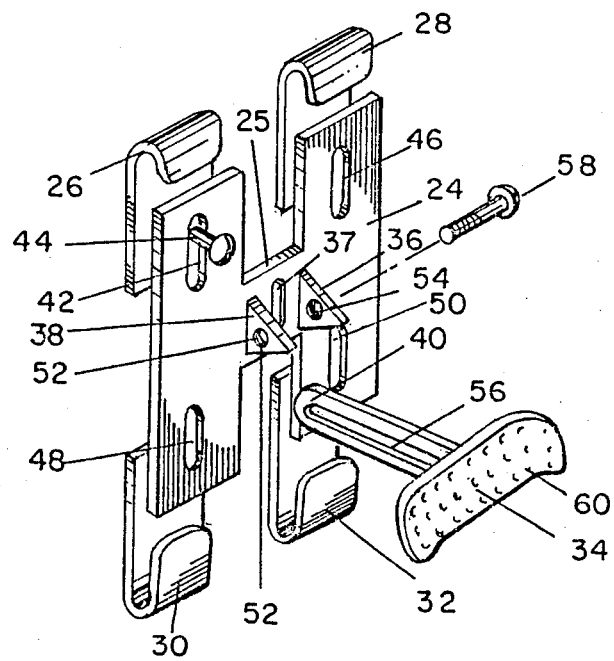
FIG. 3 is an enlarged exploded view of the device of this invention shown separated from the eyeglass frame.

Seen in FIG. 3 is cross member 25 of H-shaped support member 24 which has protruding rearwardly therefrom first nosepiece extension attachment member 36 and, parallel but spaced apart therefrom, second nosepiece extension attachment member 38 in which members are formed pin receipt apertures 52 and 54 and between which is positioned nosepiece extension member 40 which is attached thereto by pin 58 as will be described below. Nosepiece extension member 40 is adjustable in its position and extends to nosepiece member 34 on which a pad can be positioned. This pad can have a variety of configurations, can be made of metal or plastic and can be cushioned with a dimple rubberized material attached by adhesive or can even be a cloth material, which cushioning can be replaceable but which should be comfortable to the wearer yet not slippery so as to avoid its sliding of the bridge of the nose. FIG. 7 illustrates an alternate pad construction showing pad 35 having cushion receipt projection 110 with cushion 112 made of non-allergenic sponge material or equivalent placed thereover. Gauze cover material 114 can be placed over cushion 112 held in place by frame 116 which fits snugly around cushion receipt projection 110 holding cover material 114 and cushion 112 securely in place when crimped therearound. FIG. 3 also illustrates an enlarged view of the device of this invention wherein support member 24 is seen in perspective view with first hook 26 attached adjustably thereto by screw member 44 which can move up and down within first arm slot 42. For higher adjustment, screw 42 would be tightened into hook member 26 at the upper portion of the slot and for a lower adjustment the screw would be tightened into position in a lower portion of slot 42. In the same way second hook member 28 is adjustably positioned behind slot 46 through and attached by means of a screw member. Other equivalent attachment means can be utilized even including permanent attachment means such as by riveting or welding. In the same way third and fourth hook members 30 and 32 are attached respectively to the bottom arms of the H-shaped support member 24 and they are adjusted in position through movement of their screw members in slots 48 and 50, respectively. Seen in this view are first nosepiece extension attachment member 36 which has pin receipt aperture 54 provided therein and second nosepiece extension member 38 which also has a pin receipt aperture 52 in it and pin 58 shown about to be inserted into pin receipt apertures 52 and 54 when nosepiece extension member 40 is inserted therebetween and nosepiece extension member aperture 56 therein is aligned with pin receipt apertures 52 and 54 so that the pin passes through all three apertures to hold the nosepiece extension member securely in its adjusted position. Pin 58 is shown with threads to screw into the threads inside pin receipt aperture 52. It should be noted that nosepiece extension member aperture 56 is elongated to assist in the adjustment of the nosepiece extension member 40 to the proper angle as will be discussed further below for installation and usage. Clearance slot 37 can be provided in cross member 25 of H-shaped support member 24 to allow nosepiece attachment member to pass therethrough should such clearance be needed during the position adjustment of nosepiece member 34. Clearance slot 37 permits more throw for the adjustment of pin 58 in extension member aperture 56 allowing greater adjustment of nosepiece extension member 40 when it passes into clearance slot 37. Cover material 60 can be placed over nosepiece member 34 such as a dimpled prophylactic rubber pad. In this way once the device is installed by hooking first and second hooks 26 and 28 around upper bridge member 16 and tightening them in place and then hooking third and fourth hook members 30 and 31 respectively around lower bridge member 18 and tightening them upwards to securely hold the H-shaped support member 24 in position on the frames, then nosepiece member 34 is positioned at the desired angle above the nose to support the glasses on the bridge of the nose, such support being the object of this invention.

Figure 4:
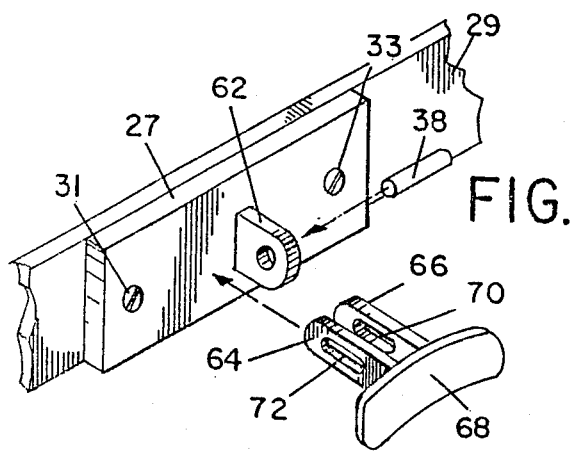
FIG. 4 is an alternate embodiment of the device oi this invention installed on a portion of a bridge member.

The device of this invention can be adapted for attachment to a single bridge member. Seen in FIG. 4 is somewhat smaller single support member 27 which is utilized with attachment screws 31 and 33 or other equivalent means of attachment such as welding or rivets to attach it to single bridge member 29. Also in this embodiment is seen single nosepiece attachment member 62 which has a similar pin receipt aperture formed therein and wherein nosepad 68 has dual nosepiece extension members 64 and 66 with elongated pin receipt apertures 72 and 70 defined respectively therein. When nosepiece extension members 64 and 66 are aligned with single nosepiece attachment member 62, pin 58 is slid into place to hold nosepiece 68 to the single bridge member.

Figure 5:
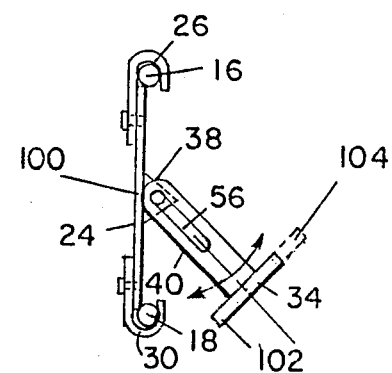
FIG. 5 is a cross-sectional view of the device as seen in FIG. 2 showing the device installed on bridge members and showing the angular adjustment range of the nosepiece.

FIG. 5 shows a cross-sectional view through the device of FIG. 2 wherein upper bridge member 16 and lower bridge member 18 are seen with H-shaped support member 24 and its upper hook member 26 and lower hook member 30 attached around and securely held to frame support member 24. Also seen in this view is second nosepiece attachment 38 having nosepiece extension member 40 pivotally attached thereto for adjustment with the pin. Once adjusted, nosepiece extension member 40 will be held securely. The pin can be tapered slightly so that when first inserted, pad member 34 can be moved up or down or at an angle with the pin in the aperture in the nosepiece extension member. When correctly positioned, the pin can be pushed further inward for its wider portion to tightly fit in the apertures holding the pad in a fixed position. As can be seen in this view, pad member 34 can be pivoted between 30–60 degrees between positions 102 and 104 for adjustment to balance the eyeglasses so that its weight is distributed between the front and rear of the frames so that much of the weight can be supported at the ear portion when the nosepiece is adjusted in the proper fashion. Pad member 34 can also be moved up or down with the pin traveling from one end to the other of extension member aperture 56 as pad member 34 is adjusted upwards or downwards or at other angles with the nosepiece extension member 40 passing through clearance slot 37.

Figure 6:
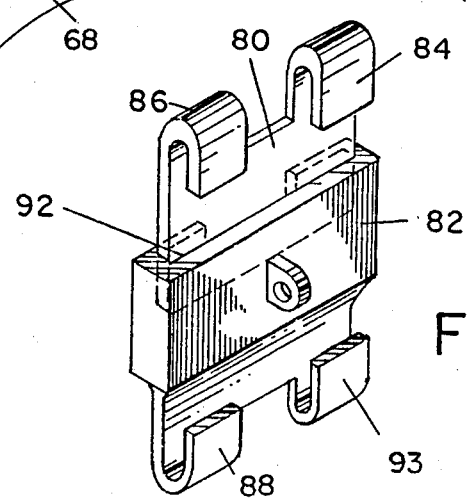
FIG. 6 illustrates an alternate embodiment of the device of this invention whereby the hook members are formed as part of attachment plates which clip into one another to easily attach and retain the device of this invention on the eyeglass frame bridge members.

FIG. 6 illustrates an alternate embodiment of the device of this invention for use on a dual bridge member showing first attachment plate 80 having integrally formed therewith first hook 86 and second hook 84 with second plate attachment 82 having formed as part thereof third hook 88 and fourth hook 90. Formed within second attachment plate 82 is receipt slot 92 for receipt of first attachment plate 80 which can be of slightly bent spring steel or other equivalent material to hold it securely by tension contact therein when inserted. The device of this embodiment can be easily clamped on a dual bridge member with first attachment plate 80 inserted and pushed into second attachment plate 82 and securely held by tension of the bent plate within the opening of the other, creating a very simple and quick installation around upper bridge member 16 and lower bridge member 18. The nosepiece extension member can be attached to the nosepiece extension attachment member which is seen on the rear thereof.

It should be clear from the various embodiments of device of this invention that the nosepiece can be adjusted to a variety of angles to and lengths from the bridge members of the eyeglasses to support the frame higher or lower as desired either further above the bridge or further forward of the bridge of the nose depending upon the adjustment desired by the wearer. In this way the wearer can achieve the best balance when the eyeglasses are fitted with the device of this invention. It should further be clear that the device of this invention could be incorporated into newly manufactured frames as well as being retrofitted onto existing frames which may have their side nasal support members removed when using the single nose bridge support of this invention.

Although the present invention has been described with reference to particular embodiments, it will be apparent to those skilled in the art that variations and modifications can be substituted therefor without departing from the principles and spirit of the invention.

I claim:

1. An eyeglass frame nose bridge support for attachment to eyeglasses of the type which include a lower bridge member and upper bridge member comprising:
   a support member of H-shaped configuration having upper arms, lower arms and a cross member on said H-shaped configuration;
   means to attach the upper arms of said H-shaped support member to said upper bridge member of said eyeglass frame;
   means to attach the lower arms of said H-shaped support member to said lower bridge member of said eyeglass frame;
   a nosepiece member disposed above the bridge of the nose and attached to the cross member of said H-shaped support member; and
   means to adjust the positioning of said nosepiece to said support member.

2. An eyeglass frame nose bridge support for attachment to eyeglasses of the type which include a lower bridge member and upper bridge member comprising:
   a support member of an H-shaped configuration;
   means to attach said support member to a bridge member of an eyeglass frame;
   a nosepiece member disposed above the bridge of the nose and attached to said support member;
   means to adjust the positioning of said nosepiece to said support member;
   adjustable hook members disposed at the end of the arms of said H-shaped support member, said hook members being adapted to be attached and tightened to said upper and lower bridge members;
   a nose extension attachment positioned on the rear of said support member, said nose extension attachment having an aperture defined therein;
   an extension member attached to said nosepiece, said extension member having an adjustment slot defined therein; and
   a pin member by which said extension member is attached to said nose extension attachment at the rear of said support member by positioning said pin member in said nose extension attachment aperture and said extension member adjustment slot when said nosepiece is in a desired position.

3. The device of claim 2 further including a clearance slot defined in said cross member of said H-shaped support member adapted to receive said extension member when positioning said nosepiece to said desired position.

* * * * *